United States Patent [19]

Fritsch et al.

[11] Patent Number: 4,789,344
[45] Date of Patent: Dec. 6, 1988

[54] PLUG-IN CONNECTOR MODULE FOR A REMOVABLE CONTROL UNIT OF A MOTOR CONTROL CENTER

[75] Inventors: Ronald J. Fritsch, Sussex; Allan E. Grams, Elm Grove, both of Wis.

[73] Assignee: Eaton Corporation, Cleveland, Ohio

[21] Appl. No.: 66,573

[22] Filed: Jun. 26, 1987

[51] Int. Cl.⁴ .............................................. H01R 29/00
[52] U.S. Cl. ....................................... 439/43; 439/53; 439/114
[58] Field of Search ............... 439/113, 114, 120, 121, 439/43, 49, 53, 207–216, 439, 440

[56] References Cited

U.S. PATENT DOCUMENTS

| | | | |
|---|---|---|---|
| 2,707,761 | 5/1955 | Page | 439/43 |
| 2,869,042 | 1/1959 | Veitch et al. | 439/43 |
| 3,806,768 | 4/1974 | Gryctke et al. | 361/388 |
| 3,855,504 | 12/1974 | Olashaw | 361/342 |
| 4,463,408 | 7/1984 | Kleinecke et al. | 361/342 |
| 4,472,761 | 9/1984 | Koslosky et al. | 439/114 |
| 4,491,896 | 1/1985 | Rickmann | 361/339 |

OTHER PUBLICATIONS

Pp. 5–6 of an unknown Siemens brochure describing a motor control center and component parts thereof.

Primary Examiner—Gil Weidenfeld
Assistant Examiner—Paula Austin
Attorney, Agent, or Firm—L. Vande Zande

[57] ABSTRACT

A molded insulating housing is received in a slot in a rear panel of a removable control unit to extend on front and rear sides of the panel. Solid bus conductors mounted in the housing have their opposite ends disposed within front and rear openings in the housing. Plug-in connector clips are affixed to the solid bus conductors adjacent the rear openings for plug-in connection with control center vertical bus bars. The solid bus conductors are afforded limited transverse sliding movement within the housing relative to the vertical bus bars for self-alignment of the plug-in connector clips with the bus bars. Bolted connection of the solid bus conductors to control apparatus is effected at the front of the control unit using a solid preformed connector strap.

11 Claims, 4 Drawing Sheets

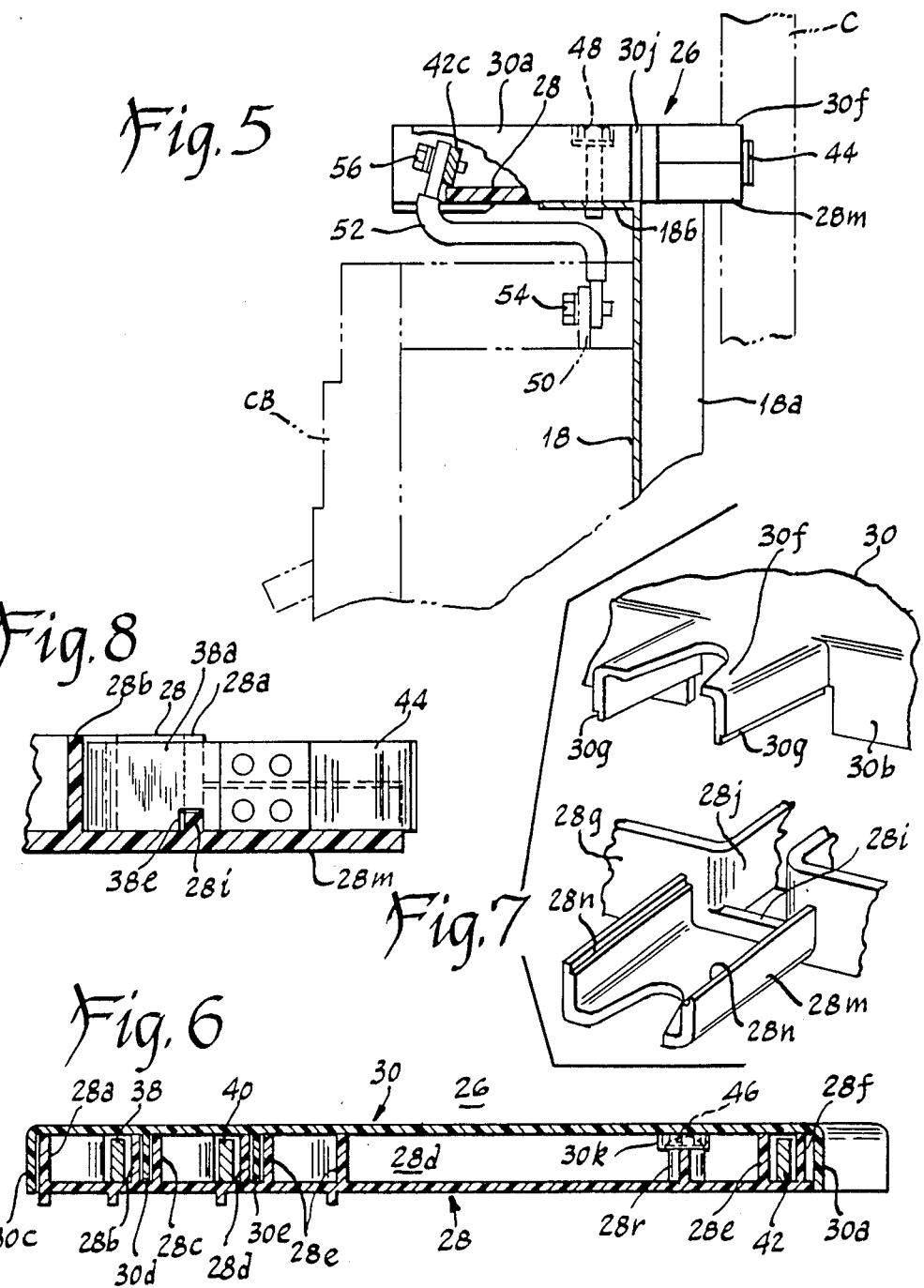

PLUG-IN CONNECTOR MODULE FOR A REMOVABLE CONTROL UNIT OF A MOTOR CONTROL CENTER

CROSS REFERENCE TO RELATED APPLICATIONS

This Application is related to copending application entitled "Latch For a Removable Control Unit of a Motor Control Center", U.S. Ser. No. 66,572, filed June 26, 1983 in the Name of Ronald J. Fritsch and to copending application entitled "Operator Mechanism Having Reduced Handle Throw and Improved Handle Lock", U.S. Ser. No. 66,571, filed June 26, 1987, now U.S. Pat. No. 4,760,220 in the name of Ronald J. Fritsch and Francis A. Lubinski, each assigned to the assignee of this Application.

BACKGROUND OF THE INVENTION

This invention relates to motor control centers having compartmentalized cabinets for receiving removable control units which are inserted or withdrawn through open fronts of the respective compartments. More particularly, this invention relates to a plug-in connector module carried by the removable control unit and having electrical connectors which stab onto bus bars of the motor control center upon insertion of the removable control unit into the respective compartment to electrically engage the bus bars and thereby connect control apparatus of the removable control unit to a source of electrical power.

Removable control units of the aforedescribed type have customarily had stab-on or plug-in connector modules attached to the rear surface of the removable control unit. These modules serve to mount electrical clip connectors which engage with the bus bars. In view of misalignment situations between the bar bars and clip connectors, the latter are commonly afforded limited pivotal movement within the module and the electrical connection between the clip connector and the control apparatus of the unit is made by flexible conductor such as a stranded wire. The stranded wire is routed from the rear-mounted connector through an opening in the rear panel of the removable control unit to the terminals of a front-mounted control device of the removable control unit. Wires routed along the rear surface of the panel are subject to damage, primarily from control device mounting screws extending through the panel. Stranded wire has an economic disadvantage in that one end thereof must be provided with a crimped or pressure connector and the opposite end is either provided with a similar connector or is brazed or welded directly to the stab-on connector clips. Moreover, where the ampere rating for the control device is high, the wire thickness increases. Thick wires are difficult to bend, require additional space due to larger bending radii, and lose the desired flexibility for pivotal movement of the clip connectors. In some instances, additional care must be taken to line the opening in the rear panel of the removable control unit with an insulating bushing or the like so that insulation on wires extending therethrough is not damaged by sharp edges of the panel opening.

SUMMARY OF THE INVENTION

This invention provides a plug-in connector module for a removable control unit of a motor control center, the module comprising an insulating housing mounted to the rear wall of the removable control unit to extend on opposite sides of the wall, and a plurality of solid bus conductors disposed within said housing between openings in the front and rear of the housing. The conductors have plug-in connector clips affixed to a respective end adjacent the rear opening of the housing and provisions for bolted connection at a respective opposite end thereof adjacent the front opening of the housing. The housing and solid bus conductors are cooperatively structured to permit limited movement of the conductors relative to said housing in a direction transverse to the direction of plug-in and removal of said control unit for self alignment of the connector clips with bus bars of the motor control center.

The invention and its advantages will be more readily apparent when reading the following description and claims in conjunction with the accompanying drawings.

BRIEF DESCRIPTION OF THE DRAWINGS

FIG. 5 is a fragmentary sectional view of the removable control unit showing the plug-in connector module in end elevation and having a part thereof broken away to show a connector strap connected between the connector module and a terminal of control apparatus mounted on the removable control unit;

FIG. 6 is a sectional view of the plug-in connector module taken along the line 6—6 in FIG. 3; and FIG. 7 is an exploded perspective view of portions of the module housing which form shrouds for the plug-in connector clips; and FIG. 8 is a fragmentary cross-sectional view taken along the line 8—8 in FIG. 3 showing an interlocking arrangement between a bus conductor and the module housing.

DESCRIPTION OF THE PREFERRED EMBODIMENT

Figure 1:
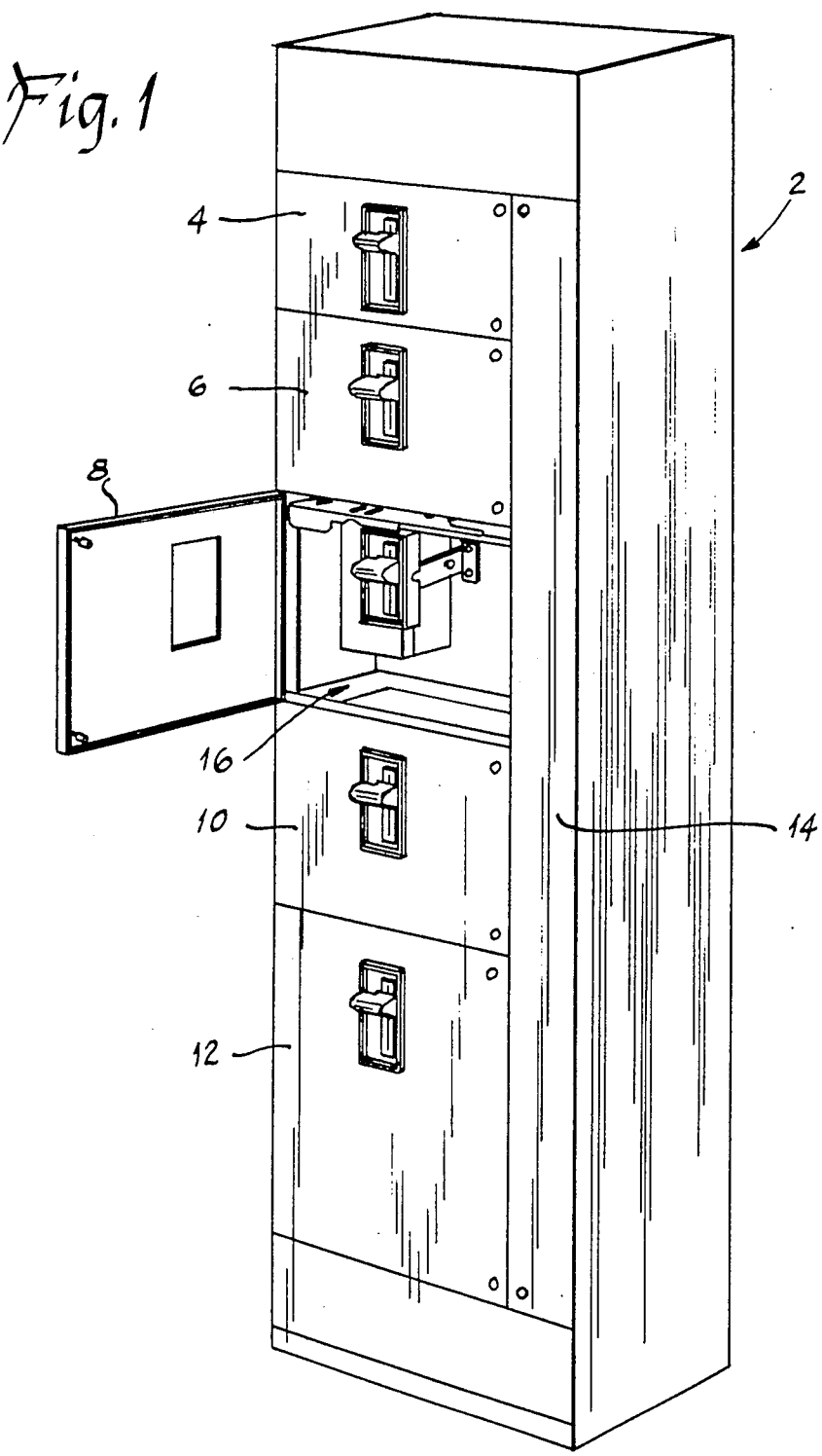
FIG. 1 is a perspective view of a motor control center having a plurality of removable control units on which the plug-in connector module of this invention is mounted.

A motor control center 2 is shown in FIG. 1. The motor control center comprises a sheet metal cabinet having a plurality of compartments open to the front of the cabinet and closed by respective doors 4, 6, 8, 10 and 12 which are hinged to the cabinet along their respective left-hand edges. A narrow door 14 is disposed to the right of the compartments and is hinged along its righthand edge to the cabinet. Door 14, when opened, exposes a wiring compartment within the cabinet.

Figure 2:
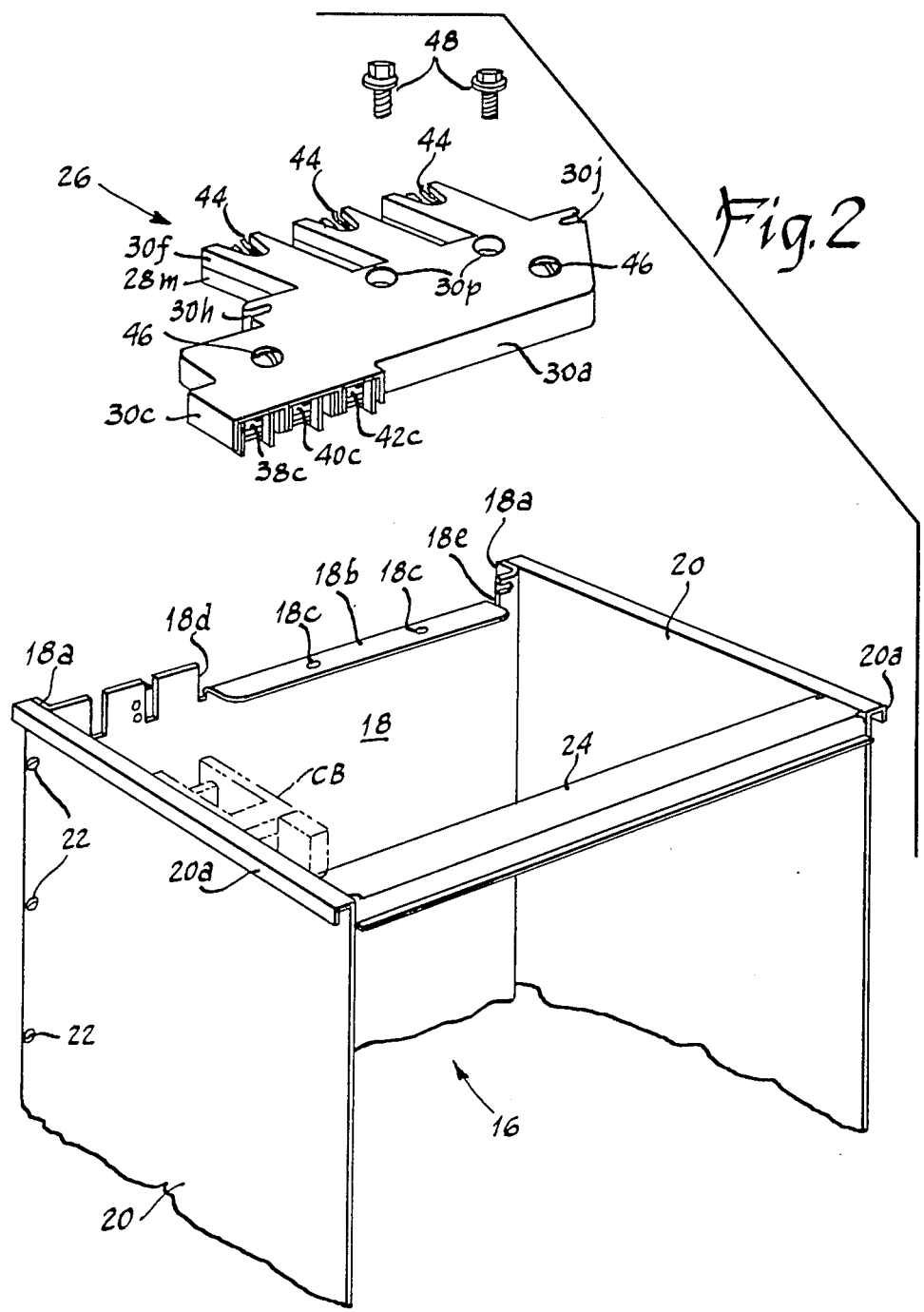
FIG. 2 is an exploded perspective view of an upper end of a removable control unit of the motor control center of FIG. 1 and the plug-in connector module of this invention.

Each compartment has a removable control unit 16 slidably mounted therein. With reference also to FIG. 2, a removable control unit 16 comprises a rear panel 18 having rearwardly turned flanges 18a formed at the lateral edges thereof and a pair of side panels 20 which are attached to the respective flanges 18a by fasteners such as screws 22 or the like. An inverted U-shaped channel 24 having downwardly turned flanges (not shown) at its opposite ends is secured between the side panels 20 at the upper forward corners of the panels to provide forward bracing and stability for the control unit 16. Each of the side panels 20 of the control unit have formed flanges 20a which project outwardly and downwardly along the upper edge thereof. While not specifically shown in the drawings, the flanges 20a are slidably received within fixed J-shaped guides in the cabinet for permitting the control unit 16 to be slidably inserted or withdrawn from the respective compartment. Reference may be had to the aforementioned copending application entitled "Latch For a Removable Control Unit of a Motor Control Center" for a more complete description of the J-shaped guides and the manner of slidably mounting control unit 16 to the cabinet.

Figure 3:
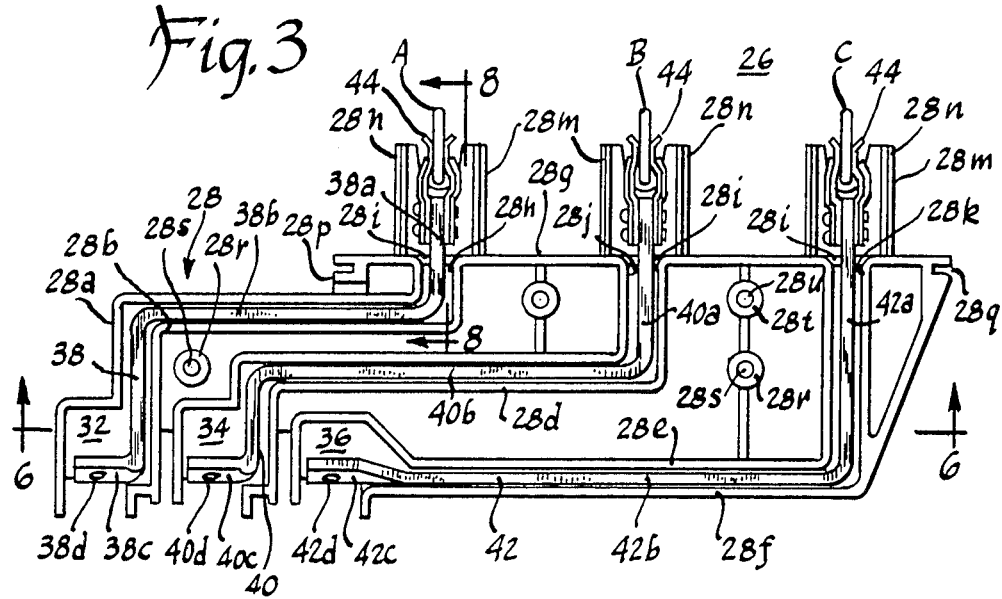
FIG. 3 is a plan view of the plug-in connector module of this invention with a cover removed therefrom.

The plug-in connector module 26 of this invention has a molded insulating housing which comprises an insulating base 28 and a complementally formed insulating cover 30. As best seen in FIG. 3, insulating base 28 has three compartments 32, 34 and 36, each of which is defined by pairs of upstanding walls of base 28. Walls 28a and 28b; define compartment 32, walls 28c, 28d define compartment 34 and walls 28e and 28f define compartment 36. Each of the walls 28a–28f join with a common rear wall 28g which has openings 28h, 28j and 28k therein such that the respective compartments 32, 34 and 36 are open to the rear side of base 28. Each of the walls 28a–28f terminates at the left-hand end of the front side of base 28 to define front openings for the compartments 32, 34 and 36. The openings 28h, 28j and 28k in rear wall 28g each have a vertical stub wall 28i extending thereacross (see FIGS. 7 and 8), and a U-shaped half-shroud 28m formed integrally with rear wall 28g and projecting rearwardly therefrom (see also FIG. 7). The side walls of half-shrouds 28m are approximately one-half the height of rear wall 28g and the upper edge of each side wall has a relieved shoulder 28n formed along the inside edge. Base 28 has laterally projecting slots 28p and 28q molded therein at the opposite ends of rear wall 28g for purposes to be described hereinafter.

Each of the compartments 32, 34 and 36 receives a respective solid bus conductor member 38, 40 and 42 formed from bar stock material of good electrical conducting properties such as copper or the like. Each bus conductor member 38–42 comprises a front-to-rear extending portion 38a, 40a and 42a, respectively, which projects rearwardly through the respective openings 28h, 28j and 28k and terminates within the respective half-shroud 28m. The rearward projecting ends of the bus members 38–42 each have a plug-in connector clip assembly 44 affixed thereto which is open in the rearward direction for plug-on attachment to a respective vertical bus bar A, B or C housed within the motor control center cabinet. Each bus member further comprises a transversely extending portion 38b–42b, respectively, joined at right angles to the respective portions 38a–42a and extending toward the left-hand end of base 28. The left-hand ends of bus members 38–42 are suitably formed to terminate in angularly offset ends 38c, 40c and 42c, respectively, adjacent the openings in the front of the housing defined by walls 28a–28f. It should be noted that the left-hand ends of bus members 38 and 40 are formed with successive right-angle bends to provide a forward extension for the respective bus members such that the angularly offset ends 38c and 40c are adjacent the openings in the front wall of the housing.

Each angularly offset end 38c–42c is provided with a hole 38d, 40d and 42d, respectively.

The complemental structural configurations of the bus members 38–42 and the compartments 32–36 permit limited lateral movement of the bus members with respect to the housing transversely of the front-to-rear direction of a plug-in connection made by clips 44. To this end, the spacing between each cooperating pair of walls defining a respective compartment 32–36 is greater in the transverse direction than in the front-to-rear direction. In the latter instance the spacing is sufficiently greater than the stock thickness of the bus conductor members 38–42 to permit lateral or transverse movement of the bus conductor member but to severly restrict movement thereof in the front-to-rear direction. Conversely, the spacing of the cooperative pairs of walls in the transverse direction is significantly greater than the stock thickness of the bus conductor members to afford lateral transverse movement of the conductor within the housing when the plug-in connectors 44 are stabbed onto vertical bus bars of the motor control center cabinet, thereby to permit the conductors 38–42 and clips 44 to compensate for any misalignment with the vertical bus bars. Bus conductor members 38–42 are each provided with a notch 38e, 40e and 42e (only notch 38e being shown, see FIG. 8), which is disposed over the respective stub wall 28i to positively control the front-to-rear position of the bus conductor members as the same project rearwardly of wall 28g toward vertical bus bars of the motor control center cabinet. The significant length of transverse portions 38b–42b of bus conductor members 38–42 and the cooperating transverse portions of the walls 28a–28f provides good bearing and guiding surfaces for the transverse movement of bus members 38–42.

Cover 30 of the plug-in connector module 26 is constructed to overlie the open side of base 28 and envelope the walls 28a, 28f and 28g that define the periphery of the base. Cover 30 comprises a front peripheral wall 30a which extends around the right-hand side to a rear wall 30b, and a left-hand side and rear peripheral wall 30c. Cover 30 is also provided with depending ribs forming interior walls 30d and 30e. The rear wall 30b of cover 30 has rearwardly projecting U-shaped half-shrouds 30f formed integrally therewith. Each side wall of half-shrouds 30f extends approximately one-half the height of the aforementioned walls of the cover. The lower edge of each side wall of half-shrouds 30f has a relieved shoulder 30g formed along the outer edge to be complemental to the shoulders 28n on shrouds 28m. Cover 30 is also provided with laterally opening slots 30h and 30j adjacent the ends of rear wall 30b.

Figure 4:
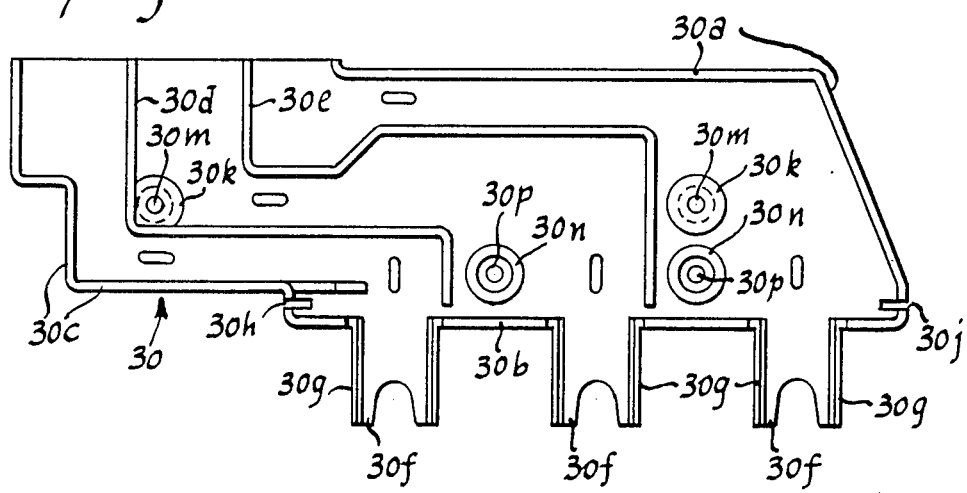
FIG. 4 is a plan view of a cover for the connector module of FIG. 3 shown removed therefrom in a folded-over position.

The cover 30 is assembled to base 28 to entrap conductor members 38–42 therebetween by rotating it 180° from the position illustrated in FIG. 4 along the forward edge 30a and then placing it over base 28 such that the walls 30a, 30b and 30c are disposed to the outside of walls 28a, 28g and 28f, respectively. When so assembled, the wall 30d is disposed between wall 28b of compartment 32 and wall 28c of compartment 34, and wall 30e is disposed between wall 28d of compartment 34 and wall 28e of compartment 36. The labyrinth arrangement of walls 30d and 30e within the respective walls 28b–28c and 28d–28e provides increased over-surface insulation paths between adjacent conductor members. Base 28 is provided with a pair of upstanding bosses 28r having holes 28s which align with corresponding bosses 30k having holes 30m in cover 30. A pair of thread rolling screws 46 (FIG. 2) are inserted through holes 30m and threadably engage holes 28s in the base 28 to secure the cover 30 to the base 28. A second pair of bosses 28t having holes 28u are provided in base 28 which align with corresponding bosses 30n in cover 30 when assembled to base 28 such that holes 30p in bosses 30n align with the holes 28u in the base. The inner surfaces of bosses 30n are recessed to receive bosses 28t telescopically therein.

Rear panel 18 of removable control module 16 has a flange 18b sheared from the upper edge of the panel and formed over at right angles thereto to provide a shelf for receiving the connector module 26. Flange 18b has a pair of holes 18c formed therein which align with the holes 28u, 30p of the connector module assembly 26 when the connector module is positioned on the flange 18b. The formation of flange 18b establishes a pair of vertical edges 18d and 18e in the panel 18 on opposite ends of flange 18b Connector module 26 is positioned to the rear panel 18 such that the grooves 28p, 30h align with and receive vertical edge 18d and grooves 28q, 30j align with and receive vertical edge 18e. When so aligned, the module 26 rests upon flange 18b and is secured thereto by a pair of thread rolling screws 48 which pass through aligned holes 28u, 30p in the base and cover, respectively, of the connector module and threadably engage holes 18c in flange 18b. When so mounted, solid bus members 38–42 extend from the connector clips 44 positioned at the rear of panel 18 to the front of that panel within the insulating housing of module 26 and provide a solid bolt-on connection means within the openings at the front of connector module 26.

As seen in FIG. 5, the control apparatus of the removable control unit is mounted to the front surface of panel 18. The control apparatus may by example be a molded case circuit breaker CB shown in phantom lines having a first set of terminals 50 at an upper end thereof. With the locations of the ends 38c, 40c and 42c of the solid bus members of the connector module substantially established by the attachment of module 26 to panel 18, a preformed solid connector strap such as 52 may be bolted to the terminal 50 by a screw 54 and bolted to the end of the respective conductor such as 42c within the front opening of connector module 26 by a thread rolling screw 56 or the like. Thus the entire electrical connection from the bus bars A, B and C (FIGS. 3 and 5) to which plug-in connector clips 44 attach, to the control apparatus CB is achieved through solid, rigid current carrying conductors and is brought from the rear of removable control unit 16 to the front thereof within an insulating housing to greatly reduce any accidental contact of an electrical conductor with an electrically conductive part of the removable control unit support structure. Although the improved plug-in connector module of this invention has been shown and described in a single preferred embodiment, it is susceptible of various modifications without departing from the scope of the appended claims.

We claim:

1. A plug-in connector module carried by a removable control unit of a motor control center electrically connecting control apparatus of said control unit to vertical bus bars of said motor control center, said bus bars being stationarily mounted in said motor control center and said control unit with said connector module carried thereon being movable inwardly and outwardly of said motor control center relative to said bus bars, comprising, in combination:

an insulating housing attached to a rear wall of said control unit, said housing having front and rear portions extending on respective opposite sides of said wall and openings in said front and rear portions;

a plurality of solid bus members disposed within said insulating housing, opposite ends of each bus member terminating within said housing adjacent a respective front and rear opening in said housing, each said bus member comprising plug-in connector means at one end adjacent a respective rear opening of said housing for plug-in connection with said vertical bus bars and means for providing bolted connection at an opposite end adjacent a respective from opening for bolted connection with said control apparatus.

2. The plug-in connector module defined in claim 1 wherein said means providing bolted connection with said control apparatus comprises solid preformed connector bus bolted at one end to said solid bus member and at an opposite end to said control apparatus.

3. The plug-in connector module defined in claim 2 wherein said housing comprises vertically extending grooves slidably receiving edges of an opening formed in said rear wall of said control unit interlocking said housing to said rear wall.

4. The plug-in connector module defined in claim 1 wherein said housing comprises an insulating base and insulating cover;

said base having a plurality of compartments for individually receiving a respective bus member therein, each of said compartments being defined by a cooperating pair of upstanding walls and being separated by a space between respective walls of adjacent compartments;

said cover overlying said upstanding walls of said base for closing said compartments; and insulating means disposed between said base and said cover in each said space between respective walls of adjacent compartments.

5. The plug-in connector module defined in claim 4 wherein said insulating means comprises a plurality of depending ribs formed on said cover and disposed in said spaces.

6. The plug-in connector module defined in claim 5 wherein said walls and said ribs project forwardly within said opening in said front portion of said housing for individually isolating said bus member opposite ends.

7. The plug-in connector module defined in claim 4 wherein said solid bus members have means engaging with said housing for restricting movement in a front-to-rear direction and providing limited lateral movement transverse to said front-to-rear direction.

8. The plug-in connector module defined in claim 7 wherein said means engaging with said housing comprises a notch formed in each respective solid bus member cooperatively disposed over a portion of said housing at said rear openings for positively establishing rearward extension of said solid bus members from the rear of said insulating housing.

9. The plug-in connector module defined in claim 7 wherein said solid bus members have a portion of their length formed transversely to said front-to-rear direction and said compartments have portions formed trasversely to said front-to-rear direction complementally to said solid bus members.

10. The plug-in connector module defined in claim 9 wherein said cooperating pairs of walls defining respective ones of said compartments are spaced apart in said transverse portions to closely conform to the thickness of said solid bus member for restricting front-to-rear movement and for guiding said solid bus members for lateral movement, said cooperating pairs of walls in portions thereof extending in said front-to-rear direction being spaced apart by an amount greater than the thickness of said solid bus member for permitting said limited lateral movement of said solid bus member in the transverse direction.

11. The plug-in connector module defined in claim 10 wherein said transverse portions of said solid bus members comprise a substantial portion of the overall length of said members for guiding said solid bus members for said lateral movement.

* * * * *